United States Patent [19]

Drinkard et al.

[11] Patent Number: 4,609,785
[45] Date of Patent: Sep. 2, 1986

[54] UNIVERSAL HANDSET MOUNT

[75] Inventors: Tye C. Drinkard, Forest; Arthur E. Douglas, Lynchburg, both of Va.

[73] Assignee: General Electric Company, Schenectady, N.Y.

[21] Appl. No.: 727,736

[22] Filed: Apr. 29, 1985

[51] Int. Cl.[4] .................. H04M 1/04; F16M 13/00
[52] U.S. Cl. .................. 179/146 R; 179/153; 179/178; 248/314; 248/558
[58] Field of Search .......... 179/146 R, 178, 100 C, 179/153, 100 R; 455/89, 90; 248/558, 314

[56] References Cited

U.S. PATENT DOCUMENTS

| 3,387,904 | 6/1968 | Beha | 312/245 |
|---|---|---|---|
| 3,941,951 | 3/1976 | Engstrom et al. | 179/179 |
| 4,090,613 | 5/1978 | McPherson | 248/314 |
| 4,111,390 | 9/1978 | St. Jean | 248/274 |
| 4,491,696 | 1/1985 | Haskins et al. | 179/100 C |
| 4,515,998 | 5/1985 | Pinede et al. | 179/100 C |

FOREIGN PATENT DOCUMENTS 2907850 1/1980 Fed. Rep. of Germany ...... 248/558

Primary Examiner—Gene Z. Rubinson
Assistant Examiner—Danita R. Byrd
Attorney, Agent, or Firm—Robert C. Lampe, Jr.

[57] ABSTRACT

An improved arrangement for mounting a telephone handset in a plurality of orientations comprises a wedge-shaped mounting plate and cooperating L-shaped handset hanger. The mounting plate is generally square in plan form with a base generally perpendicular to the sides and an inclined upper face. The base and upper face each are provided with four sockets in a back-to-back arrangement, pairs of which share common axes perpendicular to the base. The handset hanger has a pair of rearwardly projecting bosses which mate with a pair of sockets of either face to provide at least five different orientations of the handset hanger with respect to the mounting plate to accommodate differently sloped surfaces upon which the mounting plate may be secured.

14 Claims, 8 Drawing Figures

UNIVERSAL HANDSET MOUNT

CROSS-REFERENCE TO RELATED APPLICATION

This application is related to copending commonly-assigned U.S. Pat. No. De. 282,465 for a communications Handset.

BACKGROUND OF THE INVENTION

The present invention relates to telephones and, more particularly, to improved means for mounting a mobile telephone in an automobile or the like.

Mobile telephones are becoming increasingly popular, although the basic design of the handset (i.e., the receiver portion) is becoming somewhat standardized (namely, a one piece unit with integral speaker, microphone and controls). The vehicle in which the handset is mounted is not. The purchaser or user of a mobile telephone is likely to find that the portion of his automobile dashboard or console upon which he would like to mount the handset for convenience of use is angled or sloped in a manner that makes use and/or storage of the handset, considering the usual mounting arrangement, awkward or difficult. Thus, a simple handset mounting arrangement is needed which is universally adaptable to the variety of surfaces found in today's automobile so as to facilitate the use and or storage of the handset.

SUMMARY OF THE INVENTION

Accordingly, it is the primary object of the present invention to provide a universal mount which permits the mounting of a telephone handset in a plurality of orientations.

It is a further object of the present invention to provide an improved handset mount which is adaptable to a variety of sloping mounting surfaces.

It is yet another object of the present invention to provide a universal handset mounting arrangement which is simple to install and inexpensive to manufacture.

Briefly stated, the above objectives are accomplished in one embodiment of the present invention which provides an arrangement for mounting the handset in five different orientations. A wedge-shaped mounting plate for mounting on a dashboard, console or the like is provided with four counterbores or sockets arranged in a generally square pattern on each of its major surfaces, the sockets of each surface being back-to-back with common axes and interconnecting bolt holes. A handset hanger for receiving the telephone handset has a pair of rearward projecting bosses sized to fit in the sockets of either side of the wedge-shaped mounting plate. Depending on which sockets are selected, the handset hanger will assume one of five different orientations with respect to the mounting plate and the surface upon which the mounting plate is mounted. Means are provided for securing the handset hanger to the mounting plate and the mounting plate to the mounting support surface, such as the dashboard.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

BRIEF DESCRIPTION OF THE PREFERRED EMBODIMENT

Figure 1:
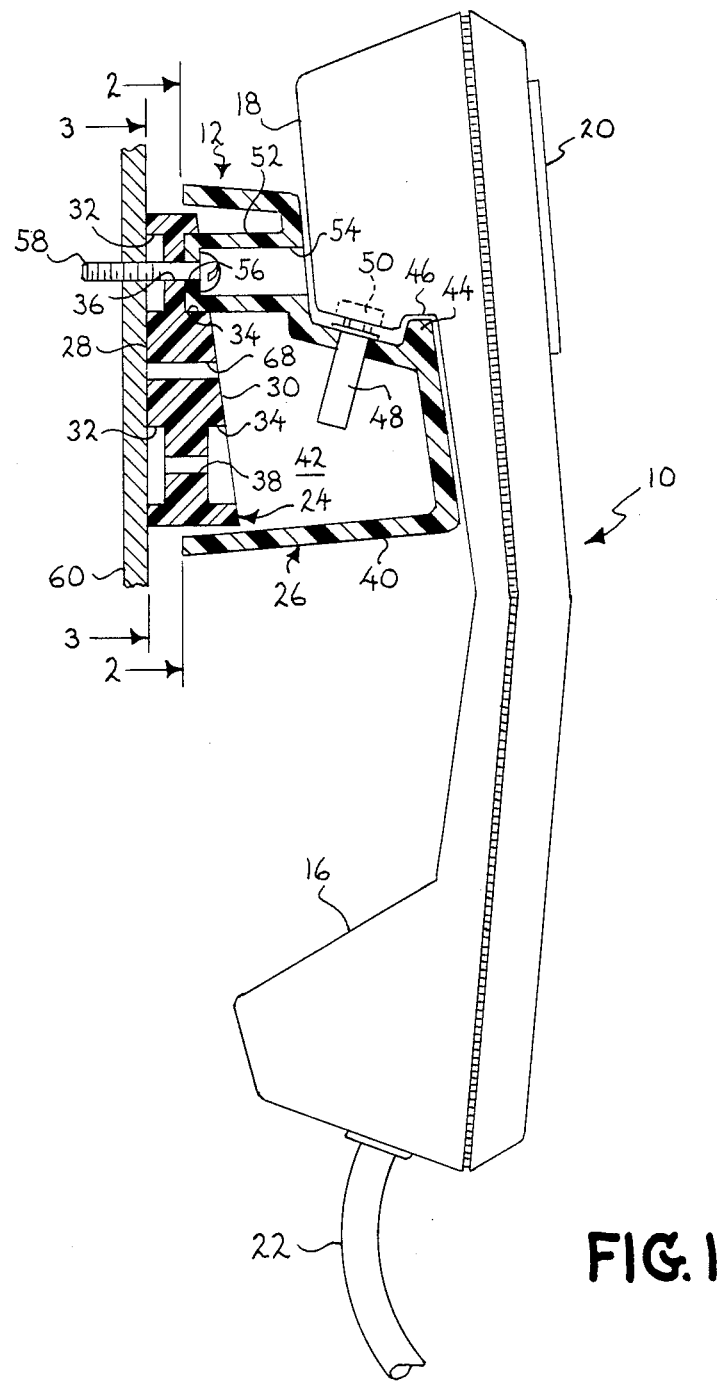
FIG. 1 is a cross-sectional view of a mounting plate, handset hanger and handset combination to which the present invention has been applied.

Referring to the drawings wherein like numerals correspond to like elements throughout, attention is first directed to FIG. 1 wherein in a mobile telephone handset 10 is depicted mounted on an improved universal mount 12. The telephone handset 10 is of the usual cradle type, having a microphone in end 16 which is placed near the users mouth, a speaker at end 18 which is placed against the users ear, a control pad 20 containing touchpads for each of the various numbers and other features built into the telephone and which do not comprise the subject matter of the present invention, and an electrical cord 22 connecting the handset to the transceiver which is usually located in the trunk of the automobile.

Figure 3:
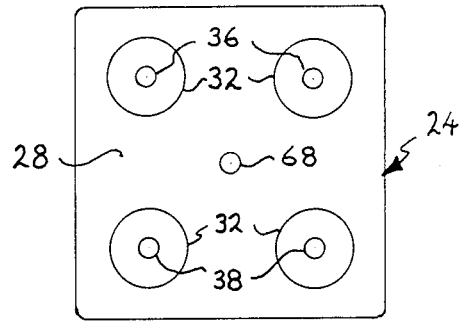
FIGS. 3 is a view along line 3—3 of FIG. 1 showing the mounting plate in greater detail.

Mount 12 is shown to comprise two portions, a wedge-shaped mounting plate 24 and a handset hanger 26. Referring also to FIG. 3, mounting plate 24 is shown to be generally square in plan form with a base 28 and an opposed inclined face 30. Base surface 28 is provided with four cylindrical counterbores or sockets 32 arranged in a square pattern, the axes of the sockets being perpendicular to base surface 28. In a similar manner, face 30 is provided with four counterbores or sockets 34 in back-to-back relationship with sockets 32 and having common axes. Thus, sockets 34 are perpendicular to base surface 28 and angled with respect to face 30. Back-to-back pairs of sockets 32, 34 are connected by holes 36, 38, holes 38 being longer because of the increased thickness at the bottom of the wedge-shaped plate 24.

Figure 2:
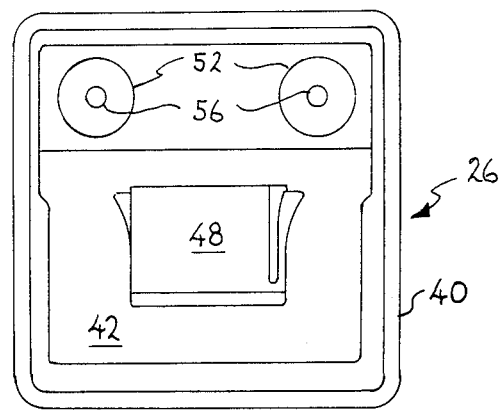
FIG. 2 is a view along line 2—2 of FIG. 1 showing the interior of the handset hanger of FIG. 1.

Referring now to FIGS. 1 and 2, the handset hanger 26 is shown to comprise a generally L-shaped hollow shell 40 defining an interior cavity 42. The base leg of hanger 26 is provided with a hook member 44, which is adapted to engage a mating slot 46 formed within handset 10, and a magnet 48 which cooperates with a metal strip 50 on handset 10 to retain the handset on its hook member 44. Magnet 48 is preferably of the snap-in type taught in U.S. Pat. Nos. 3,425,729 and 3,451,707, the magnet being necessary because the housing of handset 10 and hanger 26 are preferrably made of a plastic material, Lexan TM polycarbonate resin being the preferred choice for hanger 26. Handset 10 and handset 26 are further depicted in copending commonly-assigned U.S. design patent application Ser. No. 06/562,200 filed Dec. 16, 1983.

The back leg of hanger 26 has attached thereto within cavity 42 a pair of spaced apart, rearwardly projecting cylindrical bosses 52 sized to be received within pairs of sockets 34 or 32. The outer dimensions of hanger 26 are such that mounting plate 24 is partially received within cavity 42 when bosses 52 are inserted into their mating sockets. Bosses 52 are each provided with a forward facing counterbore 54 with holes 56 extending through the shell at the base of the counterbores and in general alignment with holes 36. Screws 58 through holes 36, 56 secure the hanger to the mounting plate and the mounting plate to a support surface 60. As depicted in FIG. 1, support surface 60 is substantially vertical, so mounting plate 24 is positioned as shown with inclined face 30 within housing 26 such that bosses 52 engage the sockets on the inclined face. Thus, hanger 26 is mounted generally perpendicular to support surface 60 and handset 10 can hang generally vertically.

Figure 4:
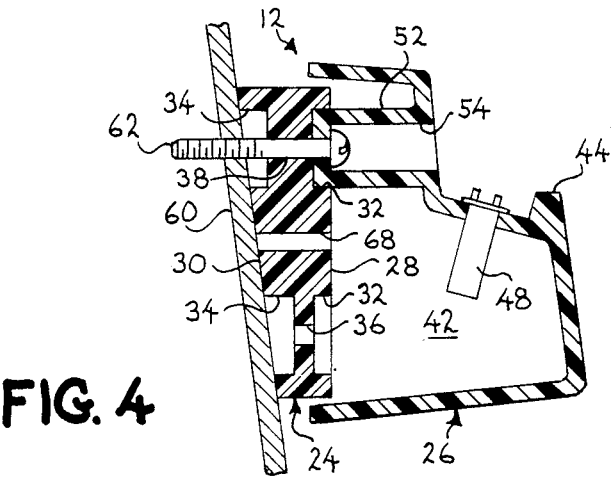
FIG. 4 is a cross-sectional view similar to FIG. 1 depicting the handset hanger in a different orientation with respect to the mounting plate.

Consider now the configuration of FIG. 4 in which hanger 26 is mounted in a downward sloping direction with respect to support surface 60 either because support-surface 60 which represents an automobile dashboard, console or the like, is sloped back or, if surface 60 is vertical, the user prefers his handset to be mounted other than vertical. In FIG. 4, base surface 28 is received within hanger cavity 42 such that bosses 52 engage a pair of sockets 32. As with configuration of FIG. 1, bosses 52 are firmly seated within the sockets to preclude wobble, and the hanger and mounting plate are secured together and to support surface 60 by means of screws 62.

Figure 5:
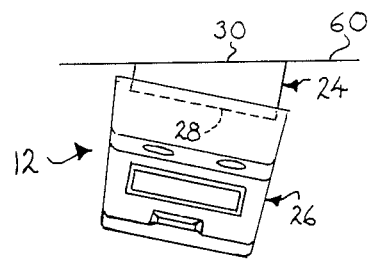
FIGS. 5 through 7 illustrate in a more simplified manner three other mounting orientations of the handset hanger with respect to the mounting plate.
Figure 6:
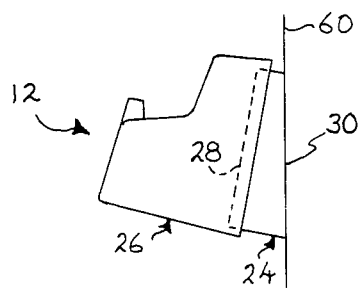
Figure 7:
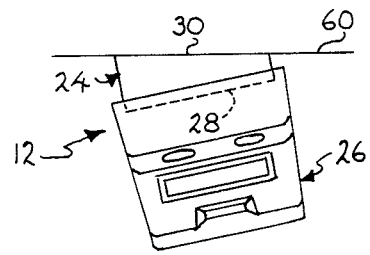

FIGS. 5, 6 and 7 depict alternative configurations in which the mounting plate is rotated 90°, 180° and 270°, counterwise, respectively, when viewed from the front. This results in upward, left and right facing hangers, respectively, with respect to the support surface. Thus, four possible orientations of the housing with respect to the mounting plate and support surface are possible when the hanger is mounted against base surface 28 (FIGS. 4 through 7). Yet another orientation is possible (FIG. 1) when the hanger is mounted against inclined face 30. Whichever surface (28, 30) is not against hanger 26 abuts mounting surface 60. Accordingly, surfaces sloped in any direction, as well as unsloped surfaces, can be accommodated with this universal mounting arrangement.

Figure 8:
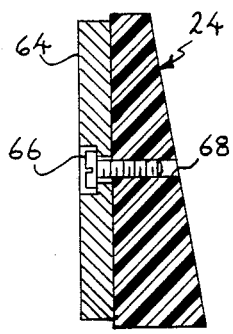
FIG. 8 illustrates an alternative mounting arrangement for the mounting plate of FIG. 1.

In yet another embodiment of FIG. 8 a magnet 64 is secured to the base surface 28 of mounting plate 24 by means of a screw 66 threaded into hole 68 in the mounting plate. This would be accomplished after mounting plate 24 and hanger 26 had been secured together as through the use of bolts through cooperating holes 36, 56 (FIG. 1). Such a magnet provides a convenient means for removably attaching mounting plate 24 to a metallic surface.

The best mode for carrying out this invention has been set forth in the description above. In particular, this has been accomplished by setting forth preferred structral arrangements incident to successful practicing of the invention in the best way contemplated at the time of executing this patent application.

It should be obvious to one skilled in the art that certain changes can be made to the above-described invention without departing from the inventive concepts thereof. For example, instead of providing the mounting plate with four holes (36, 38) therethrough, arranged in a square, other patterns of spaced holes (greater than four) could be utilized as long as the hole pairs mated with the pair of bosses 52 at different orientations of the support plate. In addition, the hanger need not be hollow, and the bosses could assume any (equal) lengths depending upon how much, if any, of the mounting plate was desired to be covered by the hanger. Further, it is apparent that the mounting plate of FIG. 1 could be rotated 180° such that holes 38 align with boss holes 56 to provide a greater stand-off distance for the hanger from support surface 60 which may be useful in allowing the handset 10 to clear a nearby obstacle. Furthermore, it is anticipated that the handset holder may be mounted together with the mounting plate using screws and nuts, then mounted to the dash board, etc. with double sided tape or other non-hardware methods to achieve the desired angle. And, the counterbores or sockets in the mounting plate can conveniently accommodate blind nut arrangements. It is intended that the appended claims cover these and all other variations in the present invention's broader inventive concepts.

Having thus described the invention, what is claimed and desired to be secured by letters patent of the United States is:

1. An improved arrangement for mounting a telephone handset in a plurality of orientations comprising: a mounting plate having four sides, a base generally perpendicular to said sides, and an inclined face, said base having four sockets arranged in a generally square pattern, the axes of which are generally perpendicular to said base, and said inclined face having four sockets arranged back-to-back with said base sockets and having common axes;

a handset hanger adapted to be mounted on said mounting plate and having a pair of spaced-apart bosses sized to be received in two sockets of said inclined face to provide a first orientation of said hanger with respect to said mounting plate and also to be received in multiple pairs of sockets of said base to, provide four other orientations; and means for securing said handset hanger to said mounting plate.

2. The improved mounting arrangement of claim 1 wherein said handset hanger comprises a shell defining an open-ended cavity and wherein said pair of bosses is attached to said shell and extends toward said open end.

3. The improved mounting arrangement of claim 2 wherein said hanger cavity receives said mounting plate inclined face when said hanger is in said first orientation and receives said base when said hanger is in said four other orientations.

4. The improved mounting arrangement of claim 1 wherein said means for securing said handset hanger to said mounting plate comprises mating holes through said bosses and said receiving sockets, and screws through said holes securing said bosses to said mounting plate.

5. The improved mounting arrangement of claim 1 further comprising a hook member formed on said handset hanger to receive a handset.

6. The improved mounting arrangement of claim 5 wherein said hanset hanger is generally L-shaped, having a base leg including said hook member and a back leg having said bosses attached thereto.

7. An improved mounting arrangement for mounting a telephone handset in a plurality of orientations comprising:

a generally L-shaped handset hanger, the base leg of which includes a hook member for engaging a telephone handset and the back leg of which has attached thereto a pair of spaced-apart bosses;

a generally wedge-shaped mounting plate having first and second surfaces inclined with respect to each other, said surfaces having formed therein first and second pluralities of spaced-apart sockets, respectively, sized to receive said bosses, said sockets being located such that said that said hanger assumes a first plurality of orientations when said bosses are received by different ones of said first plurality of sockets and another orientation when said bosses are received by two of said second plurality of scokets; and means for securing said handset hanger to said mounting plate in any of said orientations 8. An improved arrangement for mounting a telephone handset in a plurality of orientations comprising:

a generally L-shaped handset hanger, the base leg of which includes means for engaging a telephone handset and the back leg of which has attached thereto a pair of spaced-apart bosses;

a generally wedge-shaped mounting plate having a base and a face inclined with respect to said base, said base having formed therein a plurality of sockets spaced apart from each other and sized to receive said bosses, said sockets being oriented such that, depending upon which sockets are selected to receive said bosses, said handset hanger assumes any of a first plurality of orientations with respect to said mounting plate;

said inclined face having formed therein a second plurality of sockets spaced apart from each other and sized to receive said bosses, said second plurality of sockets being oriented such that when they receive said bosses, said handset hanger assumes another orientation with respect to said mounting plate; and means for securing said handset hanger to said mounting plate in any of said orientations.

9. A variable position mounting bracket for a telephone handset comprising:

a generally L-shaped handset hanger, the base leg of which serves as a support for handset and the back leg of which defines an open-ended cavity, said back leg having attached thereto a pair of spaced apart bosses extending outwardly toward the open end;

a generally, wedge-shaped mounting plate shaped to be received within said cavity, comprising a base having four sockets formed therein generally perpendicular to said base, an inclined face at an acute angle to said base and having two sockets formed therein generally perpendicular to said base, each of said sockets sized to receive said bosses; and means for securing said bosses within a pair of sockets on either said base or inclined face;

whereby, depending upon which sockets are seleced to receive said bosses, any of five orientations of said hanger with respect to said mounting plate can be obtained.

10. An improved arrangement for mounting a telephone handset or the like in a plurality of orientations comprising a generally wedge-shaped mounting plate and a handset hanger for attaching to said mounting plate in five different orientations, said mounting plate having a base surface and an opposed inclined face, each of which are provided with four sockets arranged in four back-to-back sets, each set of sockets having a common axis generally perpendicular to said base surface, and said handset hanger having two projecting bosses sized and spaced to mate with four different ones of said sockets on said base surface and said inclined face, whereby mating said bosses with different ones of said base surface sockets results in four different orientations of said handset hanger with respect to said mounting plate and mating with two of said inclined face sockets results in a fifth orientation of said handset hanger with respect to said mounting plate.

11. The improved mounting arrangement of claim 10 further comprising means for securing said handset hanger to said mounting plate.

12. The improved mounting arrangement of claim 11 wherein said means for securing comprises screws or bolts passing through cooperating holes in said bosses and their mating sockets.

13. The improved mounting arrangement of claim 10 wherein said sets of back-to-back sockets are arranged in a generally square pattern.

14. An improved arrangement for mounting a telephone handset or the like in a plurality of orientations comprising a generally wedge-shaped mounting plate for attaching to a support surface and a handset hanger for attaching to said mounting plate in five different orientations, said mounting plate having a base surface and an opposed inclined face, said base surface being provided with four sockets and said face being provided with two sockets arranged in back-to-back paired relationship with two of said base surface sockets, all of said sockets having axes generally perpendicular to said base surface, and said handset hanger having two projecting bosses sized and spaced to mate with said sockets on said base surface and said inclined face, whereby four different orientations of said handset hangers with respect to said mounting plate are achievable depending upon which base surface sockets are mated with said pair of bosses, and whereby a fifth orientation is achievable when said pair of bosses is mated with said inclined face sockets.

* * * * *